United States Patent Office 3,382,294
Patented May 7, 1968

3,382,294
COATING COMPOSITION COMPRISING AN ACRYLIC INTER-POLYMER, AN AMINE-ALDEHYDE RESIN, AND AN ALKYD RESIN
Roger M. Christenson and Bruce N. McBane, Gibsonia, Pa., assignors to Pittsburgh Plate Glass Company, Pittsburgh, Pa., a corporation of Pennsylvania
No Drawing. Continuation-in-part of application Ser. No. 277,678, May 3, 1963. This application June 24, 1966, Ser. No. 560,104
19 Claims. (Cl. 260—850)

This application is a continuation-in-part of copending application Ser. No. 277,678, filed May 3, 1963, now abandoned.

This invention relates to coating compositions having improved properties, and more particularly to compositions comprising a modified acrylic polymer, an amine-aldehyde resin, and an alkyd resin.

Coating compositions comprising acrylic polymers, such as acrylate and methacrylate polymers, have been produced heretofore. While many such compositions have quite desirable properties, in many instances they have certain deficiencies when employed in applications requiring specific characteristics. For instance, when used as automotive topcoats, they often exhibit poorer adhesion to conventional primers than is desired. Modification of these acrylic polymers with various other monomers and resins, while overcoming many of these deficiencies, in many cases leads to other undesirable properties. Thus, for example, compositions comprising an acrylic polymer and a melamine resin usually exhibit excessive cold-cracking and lowered humidity resistance. Coatings of blends of an alkyd resin and a melamine resin also have serious deficiencies; for instance, they lose their gloss when they are sanded and then wheel-polished, a desirable and often necessary operation in automotive applications.

The coating compositions of this invention comprise a combination of several specific resinous materials in carefully regulated proportions, whereby there is achieved an especially good balance of desirable properties without any serious deficiencies, for example, when used in automotive finishes.

The compositions of this invention have numerous advantageous properties, many of which are quite unexpected and surprising in view of the deficiency in these same properties of the coating compositions known heretofore which comprise generally similar components in different combination. Among these advantages may be mentioned the following:

(1) Excellent gloss;
(2) Retention of gloss after sanding and wheel-polishing with abrasives;
(3) Good adhesion to conventional primers;
(4) Improved mar resistance;
(5) Improved resistance to gasoline and other hydrocarbons;
(6) Improved pigment wetting, an important property in formulating various colored finishes;
(7) Improved humidity resistance, as demonstrated by tests which are conventionally included in automotive paint specifications and which a coating must pass in order to be usable as an automotive finish;
(8) Improved resistance to cracking during hot-cold cycles, another test which is a prerequisite to the utilization of a coating for automobiles;
(9) Applicability at high solids concentration, thereby giving sufficient wet film thickness in a minimum number of spraying operations;
(10) Reparability of coatings using low temperature bake schedules by adding appropriate acidic catalysts.

The foregoing advantages are attained by various compositions which comprise as essential components:

(1) An interpolymer of (a) about 2 to 15 percent by weight of a hydroxyalkyl ester of an alpha,beta-ethylenically unsaturated carboxylic acid, (b) about 1 to 5 percent by weight of an unsaturated carboxylic acid, (c) at least one alkyl ester of an alpha,beta-ethylenically unsaturated carboxylic acid, such as an alkyl acrylate or an alkyl methacrylate, and, optionally, (d) up to about 40 percent by weight of a vinyl aromatic hydrocarbon;

(2) About 10 to 50 percent by weight based on the total nonvolatile resin content of the composition of an amine-aldehyde resin, such as the aldehyde condensation product of melamine, urea, or a similar amine or amide, with at least a portion of the alkylol groups of the condensation product having been etherified by reaction with an alcohol; and (3) About 5 to 35 percent by weight based on the total nonvolatile resin, of an alkyd resin.

The interpolymer of the above composition can contain as the hydroxyalkyl ester monomer any such ester, but especially preferred are alkylene glycol monoesters in which the alkylene moiety contains up to 12 carbon atoms, and particularly acrylic acid or methacrylic acid monoesters of ethylene glycol, 1,2-propylene glycol, 1,3-propylene glycol, and 1,4-butylene glycol. However, polyhydroxyalkyl esters such as 2,3-dihydroxypropyl acrylate, 6,10-dihydroxydecyl methacrylate and the like, can also be utilized.

There may also be employed similar esters of other unsaturated acids, for example, those having up to about 6 carbon atoms, including unsaturated dicarboxylic acids, such as maleic acid, fumaric acid and itaconic acid (including in the term "acids" the anhydrides of those acids which form anhydrides). The use of the esters of unsaturated dicarboxylic acids, in whole or in part, in certain compositions provides specific and desirable characteristics.

The unsaturated acid component is preferably acrylic acid or methacrylic acid, although other acids such as those described above in connection with the ester component may also be employed.

The remainder of the interpolymer is made up of one or more monomers, which may be an alkyl ester of an alpha,beta - ethylenically unsaturated carboxylic acid, such as an alkyl acrylate or an alkyl methacrylate, or which may be a vinyl aromatic hydrocarbon. Preferably, at least one alkyl acrylate or methacrylate is present. Those alkyl acrylates and methacrylates generally utilized include the ethyl, methyl, propyl, butyl, hexyl, ethylhexyl, and lauryl acrylates and methacrylates, as well as similar esters having up to about 20 carbon atoms in the alkyl group. The vinyl aromatic hydrocarbon, if one is employed, is usually styrene, an alpha-alkyl styrene, or vinyl toluene.

Specific formulation of the interpolymer in the proportions set forth is necessary in order to achieve sufficient compatibility with the other resinous components of the coating composition along with the desired properties in the coated products made therefrom. The interpolymer is produced from the above monomers using conditions and catalysts conventionally employed in making acrylate and methacrylate polymers. Thus, for example, the catalyst is ordinarily a free radical catalyst, such as cumene hydroperoxide, benzoyl peroxide, ammonium persulfate, azo-bis-isobutyronitrile or the like, and the polymerization temperature is commonly between about 65° C. and 140° C. The solvents used in making these interpolymers include aromatic hydrocarbons, alcohols, esters, ketones, and similar materials.

A second essential resinous component of the coating composition is an amine-aldehyde resin, i.e., an aldehyde condensation product of melamine, urea, acetoguanamine, or a similar compound. Generally, the aldehyde employed is formaldehyde, although the products can be made from other aldehydes, such as acetaldehyde, crotonaldehyde, acrolein, benzaldehyde, furfural, and others. While resins produced from melamine or urea are most common and are preferred, condensation products of other amines and amides can also be employed, for example, those of triazines, diazines, triazoles, guanidines, guanamines, and alkyl and aryl substituted derivatives of such compounds, including alkyl and aryl substituted ureas and alkyl and aryl substituted melamine, provided at least one amino group is present. Some examples of such compounds are N,N'-dimethylurea, benzyl urea, dicyandiamide, formoguanamine, benzoguanamine, ammeline, 2-chloro-4,6-diamino-1,3,5-triazine, 6-methyl-2,4-diamino-1,3,5 - triazine, 2 - phenyl-4-amino-6-hydroxy-1,3,5,-triazine, 3,5-diaminotriazole, triaminopyrimidine, 2 - mercapto - 4,6 - diaminopyrimidine, 2,4,6-trihydrazine-1,2,5-triazine, 2,4,6-triethyl-triamino - 1,3,5-triazine, 2,4,6-triphenyltriamino-1,3,5-triazine, and the like.

These aldehyde condensation products contain methylol or similar alkylol groups, the structure of the alkylol group depending upon the particular aldehyde employed. At least a portion, i.e., all or part, of these alkylol groups should be etherified by reaction with an alcohol. Any monohydric alcohol can be employed for this purpose, including such alcohols as methanol, ethanol, propanol, butanol, pentanol, hexanol, heptanol, and other alkanols, usually having up to about 12 carbon atoms, as well as benzyl alcohol and other aromatic alcohols; cyclic alcohols, such as cyclohexanol; monoethers of glycols, such as the Cellosolves and Carbitols; and halogen-substituted or other substituted alcohols, such as 3-chloropropanol.

The amine-aldehyde resin is produced in a manner well known in the art, using acidic or basic catalysts and varying conditions of time and temperature in accordance with conventional practice. The formaldehyde is often employed as a solution in water or alcohol, and the condensation, etherification and polymerization reactions may be carried out either sequentially or simultaneously.

The third essential component is an alkyd resin, which is especially important in order to achieve the desirable properties enumerated above. The presence of the alkyd resin in the composition is particularly necessary in order to prevent excessive cold-cracking and low humidity resistance in coatings produced from the coating compositions, as well as to permit application at high solids content, and to provide retention of gloss upon sanding and polishing.

Alkyd resins made from saturated oils or saturated fatty acids are preferred in formulating the compositions of the invention. However, there may be employed any of the saturated or unsaturated alkyd resins utilized in the coatings field, produced from any polybasic acid and polyfunctional alcohol. Thus, for example, the alkyd may be made from such polyfunctional acids as phthalic acid, maleic acid, fumaric acid, isophthalic acid, succinic acid, trimellitic acid, adipic acid, azelaic acid, sebaic acid, linoleic acid, fatty acids and the like, as well as from anhydrides of such acids. The polyfunctional alcohol can be, for example, glycerine, trimethylolethane, trimethylolpropane, pentaerythritol, sorbitol, mannitol, ethylene glycol, diethylene glycol, 2,3-butylene glycol, and similar polyols.

The alkyd resin may be oil-modified or non-oil-modified. The oil, when one is utilized, is preferably coconut oil or other saturated oil, although drying or semi-drying oils, such as fish oils, linseed oil, soybean oil or the like, can also be employed. If desired, the alkyd resin can contain a monobasic acid, such as benzoic acid, a substituted benzoic acid, or a similar monobasic aromatic acid. The alkyd can also be a polyester containing adipic acid or a similar acid along with various glycols and/or polyols.

Included within the scope of the term "alkyd resin" as used herein are reaction products of polybasic acids and polyfunctional alcohols as disclosed above, which are copolymerized with one or more other polymerizable ethylenically unsaturated monomers. Such monomers include esters of acrylic acid and methacrylic acid, acrylonitrile, olefinic hydrocarbons, and other such monomers containing a $CH_2=C<$ group.

The alkyd resin can be produced by any of the well-known methods used to prepare alkyd resins for coatings. It is desirable that some functionality such as unreacted hydroxyl groups, remain in the alkyd. When the alkyd is to be modified with another unsaturated monomer, either an unsaturated fatty acid or an alpha,beta-ethylenically unsaturated acid, such as maleic acid, fumaric acid or crotonic acid, should be present in the alkyd, and the esterification and copolymerization reactions can be carried out either simultaneously or at different stages, depending upon the nature of the alkyd employed.

In order to achieve maximum compatibility with the other components of the coating composition, it is often desirable that the alkyd be made using a relatively large excess of the polyol, and that the polyol employed contain the neopentyl structure, as do trimethylolpropane and trimethylolethane.

The coating compositions of this invention are prepared by blending the vehicle comprising the foregoing resinous components in the proportions specified, along with suitable solvents, such as xylene, toluene, butanol, acetone and the like, and if desired, a pigment composition. The pigments may be of any conventional type, and may include metallic pigments which produce a polychromatic finish. The coating compositions are applied by conventional techniques, such as spraying, and then baked to provide a hard, glossy coating. Typical baking schedules are from about 20 to 40 minutes at 225° F. to 275° F.

In some cases, it is desirable to cure the compositions at somewhat lower temperatures, such as 170° F. to 200° F. This can be done with but little sacrifice in properties by the addition of an acid catalyst. Essentially any acid which is soluble in hydrocarbons can be employed for this purpose, the amount added being generally between about 1 percent and about 3 percent by weight based on the vehicle resin solids. Smaller amounts of acid catalyst are sometimes added even when curing at higher temperatures is contemplated.

The preferred catalysts are alkyl acid phosphates, such as monomethyl acid phosphate, monoethyl acid phosphate, monopropyl acid phosphate and monobutyl acid phosphate, as well as the corresponding dialkyl compounds, such as dibutyl acid phosphate. A mixture of mono- and dialkyl phosphates is often utilized. In addition to the alkyl acid phosphates, examples of other acid catalysts which can be used include phosphoric acid, maleic acid and anhydride, fumaric acid, chloromaleic acid and anhydride, alkyl acid phthalates such as methyl, ethyl, propyl and butyl acid phthalates, monoalkyl succinates and maleates such as methyl, ethyl, propyl and butyl succinates and maleates, and others having sufficient solubility in hydrocarbon solvents to permit them to be dissolved in the coating composition in the desired proportion.

Set forth below are several examples of the preparation of the components of the compositions of the invention. The procedures and techniques employed are entirely conventional, and thus serve only to indicate the composition of those components utilized in the herein-described examples of the unique coating compositions formulated therefrom.

Examples A to F relate to the several interpolymers utilized in demonstrating the formulation of the compositions of the invention. These interpolymers were produced by charging the monomers specified below into a reaction vessel along with sufficient solvent to make the solids content of the mixture about 50 percent. The solvent employed was a 2 to 1 weight blend of xylene and n-butanol. The mixture was refluxed for 10 hours in the presence of 0.5 weight percent (based upon the monomers) of benzoyl peroxide catalyst. During the reaction, additional 0.25 weight percent portions of the catalyst, as a 2 percent solution in the aforesaid solvent mixture, were added after the second, fourth, sixth and eighth hours. Using this procedure, the interpolymers of the examples were produced from the following monomers:

EXAMPLE A

| | Parts by weight |
|---|---|
| Methyl methacrylate | 744 |
| Lauryl methacrylate | 360 |
| Ethylene glycol monoester of methacrylic acid | 60 |
| Methacrylic acid | 36 |

EXAMPLE B

| | Parts by weight |
|---|---|
| Methyl methacrylate | 930 |
| Lauryl methacrylate | 450 |
| 1,2-propylene glycol monoester of methacrylic acid | 75 |
| Methacrylic acid | 45 |

EXAMPLE C

| | Parts by weight |
|---|---|
| Methyl methacrylate | 620 |
| Lauryl methacrylate | 300 |
| Ethylene glycol monoester of acrylic acid | 50 |
| Methacrylic acid | 30 |

EXAMPLE D

| | Parts by weight |
|---|---|
| Methyl methacrylate | 480 |
| Lauryl methacrylate | 450 |
| Ethylene glycol monoester of methacrylic acid | 75 |
| Methacrylic acid | 45 |
| Styrene | 450 |

EXAMPLE E

| | Parts by weight |
|---|---|
| Methyl methacrylate | 465 |
| Ethyl acrylate | 345 |
| Butyl methacrylate | 510 |
| 1,2-propylene glycol monoester of methacrylic acid | 150 |
| Methacrylic acid | 30 |

EXAMPLE F

| | Parts by weight |
|---|---|
| Methyl methacrylate | 180 |
| Butyl methacrylate | 120 |
| Styrene | 300 |
| 2-ethylhexyl acrylate | 300 |
| 1,2-propylene glycol monoester of methacrylic acid | 40 |
| Ethylene glycol monoester of methacrylic acid | 40 |
| Methacrylic acid | 20 |

The several types of alkyd resins employed in the examples were produced as follows:

EXAMPLE G

The following were charged into a reaction vessel:

| | Parts by weight |
|---|---|
| Coconut fatty acid | 966 |
| Trimethylolethane | 1006 |
| p-t-Butyl benzoic acid | 74 |
| Phthalic anhydride | 1187 |
| Xylene | 90 |

The mixture was heated at 440° F. for about 15 hours while azeotropically separating the water of reaction. When the reaction was complete, sufficient xylene was added to make the total solids content 65 percent; the product had a Gardner-Holdt viscosity of $Z_1$ to $Z_2$ and an acid number of 4.3 based on the solids.

EXAMPLE H

A reaction vessel was charged with the following:

| | Parts by weight |
|---|---|
| Coconut fatty acid | 1055 |
| Trimethylolethane | 1018 |
| Phthalic anhydride | 1100 |
| Trimellitic anhydride | 62 |
| Xylene | 105 |

This mixture was heated to 440° F. over a period of 2 hours, and then refluxed at this temperature for 4½ hours while removing the water of reaction. The reaction mixture was then cooled and 1478 parts of xylene were added. The product had an acid value of 9.0 and a solids content of 65 percent.

EXAMPLE I

A mixture of 805 parts of coconut oil and 977 parts of trimethylolethane was heated to 440° F. and 1.4 parts of litharge were added. After about 40 minutes at this temperature, there was added a mixture of 691 parts of phthalic anhydride, 75 parts of maleic anhydride and 350 parts of trimethylolethane. This reaction mixture was cooled to 300° F., and 400 parts of methyl methacrylate, 200 parts of butyl methacrylate and 12 parts of dicumyl peroxide were added. The temperature was raised to 310° F. and while maintaining the temperature at 310° F. to 317° F., there was added over a period of 50 minutes a mixture of 300 parts of methyl methacrylate, 100 parts of butyl methacrylate and 28 parts of dicumyl peroxide. The reaction mixture was refluxed for a total of 9½ hours while removing the water of reaction, during which time the temperature rose to 440° F. External heating was discontinued and the mixture sparged with an inert gas for 25 minutes and cooled. After the addition of 2000 parts of xylene, the product had a solids content of 60 percent and an acid value of 4.53.

EXAMPLE J

A reaction vessel was charged with the following:

| | Parts by weight |
|---|---|
| 1,3-Butanediol | 793 |
| Trimethylolethane | 448 |
| Adipic acid | 834 |
| Phthalic anhydride | 573 |

This mixture was heated to 430° F. and maintained at this temperature for 2 hours, while removing evolved water. It was then sparged with inert gas for 15 minutes, cooled, and 740 parts of Cellosolve acetate were added. The product had a solids content of 75 percent and an acid value of 6.6.

EXAMPLE K

A mixture of 1237 parts of coconut fatty acids, 1185 parts of trimethylolethane, 1360 parts of phthalic anhydride and 120 parts of xylene was refluxed at 425° F. to 430° F. for about 7 hours until the Gardner-Holdt viscosity was T to U at 65 percent solids content in toluene. The product obtained had an acid value of 6.69, and after the addition of 1707 parts of toluene, its solids content was 66 percent.

A representative-alcohol-modified amine-aldehyde resin used in the examples below was produced as follows:

EXAMPLE L

A reaction vessel was charged with 340 parts of a 40 percent solution of formaldehyde in butanol and 285 parts of n-butanol. A 50 percent solution of sodium acid phthalate in water was added in an amount sufficient to buffer the solution at a pH of 5.6 (about 4.5 parts) and then 104 parts of melamine were added. The mixture was heated to total reflux, held for 30 minutes and then heated an additional 7 hours while azeotropically removing the water of reaction. The mixture was then distilled until the residue had a Gardner-Holdt viscosity of $Z_3+$ and the pot temperature was 264° F. A solvent mixture of equal parts of xylene and n-butanol was added in an amount sufficient to make the solids content of the product about 50 percent. The final Gardner-Holdt viscosity was B to D.

The following examples illustrate the formulation of several compositions within the scope of the invention. These examples, however, are not intended to limit the invention in any way. All parts and percentages are by weight and are based upon the nonvolatile resin solids content of the components.

EXAMPLES 1 TO 12

Using the foregoing resinous components, vehicles for coating compositions were produced by blending at room temperature the components in the proportions set forth in Table I. To the vehicle of Example 11 there were added 0.09 part of a mixture of mono- and dibutyl acid phosphate as a 7 percent xylene solution. To the vehicle of Example 12 there were added 2 parts of the same mixture as a 25 percent xylene solution.

and vehicle as described above were sprayed on phosphatized steel panels primed with an epoxy resin primer conventionally used in automotive finishes. The panels were then baked at 250° F. for 30 minutes, except for the panel containing the vehicle of Example 12, which was baked at 180° F. for 30 minutes. All the panels were subjected to various standard tests as follows:

Gloss.—Determined using a Gardner gloss meter and expressed as percent reflectance at a 20 degree angle from the horizontal.

Hardness.—Determined using a Sward Rocker and expressed as a Sward rating in which the hardness of the coating is in terms of the percentage of the hardness of plate glass.

Humidity Resistance.—Determined by exposing the panel to an atmosphere of 100 percent relative humidity at a temperature of 120° F. for 250 hours and then rating the appearance of the panel on a numerical scale from 1 to 5, where a rating of 1 indicates a panel was not affected and a rating of 5 indicates relatively poor performance.

TABLE I.—EXAMPLES 1 TO 12

| Example No. | Interpolymer | | Alkyd Resin | | Amine-aldehyde Resin | |
|---|---|---|---|---|---|---|
| | Example | Amount | Example | Amount | Example | Amount |
| 1 | A | 55 | G | 20 | L | 25 |
| 2 | A | 65 | G | 20 | L | 15 |
| 3 | B | 55 | G | 20 | L | 25 |
| 4 | C | 55 | G | 20 | L | 25 |
| 5 | D | 55 | G | 20 | L | 25 |
| 6 | E | 55 | H | 20 | L | 25 |
| 7 | E | 55 | I | 20 | L | 25 |
| 8 | A | 55 | J | 20 | L | 25 |
| 9 | A | 55 | K | 20 | L | 25 |
| 10 | A | 55 | H | 20 | L | 25 |
| 11 | F | 40 | K | 20 | L | 40 |
| 12 | E | 55 | G | 20 | L | 25 |

The vehicles produced in the foregoing examples were employed in formulating coating compositions, along with conventional pigments and solvents. A typical pigment composition employed was a silver polychromatic pigment, made by blending 3.8 parts of aluminum paste (65.5 percent aluminum), 134 parts of interpolymer A, 48.8 parts of amine-aldehyde resin K, 30 parts of alkyd resin F, and 60.4 parts of xylene. To this there were added in some instances, small amounts of color pigments, thereby giving polychromatic finishes of varying colors. In other instances, the aluminum paste was replaced entirely by color pigments to give pastel finishes. The proportions of pigment and vehicle vary considerably depending upon the type of finish desired, the color and the particular vehicle and pigments employed. In black and polychromatic coatings the pigment solids comprise about 2 percent to 20 percent by weight of the total solids in the composition, while in pastel or other non-metallic colored finishes, the pigment solids are about 10 percent to 45 percent of the total solids.

The compositions produced by blending the pigment

Weatherometer Rating.—An accelerated weathering test employing a Weatherometer apparatus, with the rating expressed numerically from 1 to 5 as in the humidity resistance test.

Thermal Cycle Resistance.—An accelerated hot-cold cycle test to determine resistance to cracking during wide temperature changes. The panel is maintained at 100° F., with 100 percent relative humidity, for 20 hours, then at −10° F. for 24 hours, then at room temperature for 4 hours. The panel then is inspected and the cycle is repeated. The degree of cracking correlated with the number of cycles is expressed numerically as a rating of 1 to 5, as in the humidity resistance test.

Impact and Adhesion Rating.—A 4-pound weight is dropped from a height of 20 inches onto a coated panel. The degree of cracking and the adherence of the cracked portion are rated and expressed on a scale of 1 to 5, as in the humidity resistance test.

The results of the foregoing tests upon panels coated with the coating compositions of the above examples are set forth in Table II.

TABLE II

| Coating Composition | Gloss | Sward Hardness | Humidity Resistance | Weatherometer Rating | Impact and Adhesion Rating | Thermal Cycle Resistance |
|---|---|---|---|---|---|---|
| Example 1 | 70 | 30 | 2 | 2 | 3 | 1 |
| Example 2 | 65 | 28 | 2 | 2 | 2 | 1 |
| Example 3 | 62 | 32 | 2 | 4 | 3 | 3 |
| Example 4 | 74 | 36 | 3 | 4 | 3 | 2 |
| Example 5 | 74 | 38 | 2 | 3 | 3 | 1 |
| Example 6 | 70 | 34 | 2 | 2½ | 3 | 1 |
| Example 7 | 73 | 36 | 2 | 3 | 3 | 1 |
| Example 8 | 65 | 26 | 2½ | 3 | 3 | 1 |
| Example 9 | 63 | 30 | 2½ | 3 | 3 | 1 |
| Example 10 | 73 | 28 | 2½ | 2 | 2 | 1 |
| Example 11 | 71 | 36 | 3 | 1 | 3 | 1 |
| Example 12* | 72 | 22 | 3 | 2½ | 3 | 2 |

*Catalyzed and cured at 180° F.

While the foregoing table sets forth individual results of several tests, it will be appreciated that the coating must be evaluated on the basis of over-all performance, including other less definable properties. Utilizing the tests described above, as well as other bases for evaluation, it was shown that the coating compositions of the invention, prepared from varying resinous components as described herein, possess over-all properties making them desirable for use in automotive finishes and for other uses, and are relatively free from those deficiencies which preclude the utilization of other, even though somewhat similar, compositions in such applications.

These and other tests have also shown that it is particularly important that the interpolymer component contain a hydroxyalkyl ester, and that it is necessary to include the alkyd resin in the composition. Omission of either of these leads to coatings which, among other deficiencies, have drastically reduced humidity resistance and thermal cycle resistance, as well as lowered gloss and adhesion.

According to the provisions of the patent statutes, there are described above the invention and what are now considered to be its best embodiments. However, within the scope of the appended claims, it is to be understood that the invention may be practiced otherwise than as specifically described.

I claim:
1. A vehicle for a coating composition comprising:
    (1) an interpolymer of (a) about 2 to 15 percent by weight of a hydroxyalkyl ester of an alpha,beta-ethylenically unsaturated carboxylic acid, (b) about 1 to 5 percent by weight of unsaturated carboxylic acid, and (c) at least one alkyl ester of an alpha,beta-ethylenically unsaturated carboxylic acid;
    (2) about 10 to 50 percent by weight of a monohydric alcohol-modified amine-aldehyde resin; and
    (3) about 5 to 35 percent by weight of an alkyd resin.
2. A vehicle for a coating composition comprising:
    (1) an interpolymer of (a) about 2 to 15 percent by weight of a hydroxyalkyl ester of an alpha,beta-ethylenically unsaturated carboxylic acid, (b) about 1 to 5 percent by weight of unsaturated carboxylic acid, (c) at least one alkyl ester of an alpha,beta-ethylenically unsaturated carboxylic acid, and (d) up to about 40 percent by weight of vinyl aromatic hydrocarbon;
    (2) about 10 to 50 percent by weight of a monohydric alcohol-modified amine-aldehyde resin; and
    (3) about 5 to 35 percent by weight of an alkyd resin.
3. A vehicle for a coating composition comprising:
    (1) an interpolymer consisting essentially of (a) about 2 to 15 percent by weight of a monoester of an alkylene glycol having up to about 12 carbon atoms and an alpha,beta-ethylenically unsaturated carboxylic acid having up to about 6 carbon atoms, (b) about 1 to 5 percent by weight of an unsaturated carboxylic acid having up to about 6 carbon atoms, (c) at least one alkyl ester of an alpha,beta-ethylenically unsaturated carboxylic acid having up to about 4 carbon atoms, the alkyl groups of said ester having up to about 20 carbon atoms, and (d) up to about 40 per cent by weight of vinyl aromatic hydrocarbon;
    (2) about 10 to 50 percent by weight of a condensation product of formaldehyde and a member of the group consisting of melamine, urea, guanamine, and substituted derivatives thereof, at least a portion of the methylol groups of the said condensation product having been etherified by reaction with a monohydric alcohol; and
    (3) about 5 to 35 percent by weight of an alkyd resin.
4. The vehicle of claim 3 in which said condensation product is a butanol-modified melamine-formaldehyde resin.

5. The vehicle of claim 3 in which said alkyd resin is a saturated alkyd resin containing unreacted hydroxyl groups.
6. The vehicle of claim 3 containing as an additional component from about 1 to about 3 percent by weight based upon the vehicle resin solids of a hydrocarbon-soluble acid catalyst.
7. The vehicle of claim 6 in which said acid catalyst is an alkyl acid phosphate.
8. A vehicle for a coating composition comprising:
    (1) an interpolymer consisting essentially of (a) about 2 to 15 percent by weight of an ethylene glycol monoester of an acid selected from the group consisting of acrylic acid and methacrylic acid, (b) about 1 to 5 percent by weight of methacrylic acid, (c) at least one alkyl ester of an acid selected from the group consisting of acrylic acid and methacrylic acid, and (d) up to about 40 percent by weight of a vinyl aromatic hydrocarbon selected from the group consisting of styrene, alpha-alkyl styrene, and vinyl toluene;
    (2) about 10 to 50 percent by weight of a monohydric alcohol-modified amine-aldehyde resin; and
    (3) about 5 to 35 percent by weight of an alkyd resin.
9. The vehicle of claim 8 in which said amine-aldehyde resin is a butanol-modified melamine-formaldehyde resin.
10. The vehicle of claim 8 in which said alkyd resin is a saturated alkyd resin containing unreacted hydroxyl groups.
11. A vehicle for a coating composition comprising:
    (1) an interpolymer consisting essentially of (a) about 2 to 15 percent by weight of a 1,2-propylene glycol monoester of an acid selected from the group consisting of acrylic acid and methacrylic acid, (b) about 1 to 5 percent by weight of methacrylic acid, (c) at least one alkyl ester of an acid selected from the group consisting of acrylic acid and methacrylic acid, and (d) up to about 40 percent by weight of a vinyl aromatic hydrocarbon selected from the group consisting of styrene, alpha-alkyl styrene, and vinyl toluene;
    (2) about 10 to 50 percent by weight of a monohydric alcohol-modified amine-aldehyde resin; and
    (3) about 5 to 35 percent by weight of an alkyd resin.
12. The vehicle of claim 11 in which said amine-aldehyde resin is a butanol-modified melamine-formaldehyde resin.
13. The vehicle of claim 11 in which said alkyd resin is a saturated alkyd resin containing unreacted hydroxyl groups.
14. A coating composition comprising the vehicle of claim 1, pigment and organic solvent.
15. A coating composition comprising the vehicle of claim 3, pigment and organic solvent.
16. A coating composition comprising the vehicle of claim 6, pigment and organic solvent.
17. A coating composition comprising the vehicle of claim 11, pigment and organic solvent.
18. An article containing a metallic surface coated with a cured film of the coating composition of claim 1.
19. An article containing a metallic surface coated with a cured film of the coating composition of claim 6, said coating having been cured at a temperature between about 170° F. and about 200° F.

References Cited

UNITED STATES PATENTS

| | | | |
|---|---|---|---|
| 2,819,237 | 1/1958 | Daniel | 260—851 |
| 2,940,945 | 6/1960 | Christenson et al. | 260—850 |
| 3,082,184 | 3/1963 | Falgiatore et al. | 260—851 |
| 3,230,275 | 1/1966 | Sekmakas | 260—850 |

MURRAY TILLMAN, Primary Examiner.

J. C. BLEUTGE, Assistant Examiner.